United States Patent [19]

Bruno

[11] Patent Number: 5,634,625
[45] Date of Patent: Jun. 3, 1997

[54] VALVE CLOSURE SYSTEM

[75] Inventor: Louis D. Bruno, Reading, Pa.

[73] Assignee: Rose Controls Corporation, Reading, Pa.

[21] Appl. No.: 595,267

[22] Filed: Jan. 1, 1996

[51] Int. Cl.$^6$ ........................... F16K 1/22
[52] U.S. Cl. ............ 251/313; 251/192; 251/305
[58] Field of Search ..................... 251/305, 313, 251/192

[56] References Cited

U.S. PATENT DOCUMENTS

| 246,709 | 9/1881 | Barnum | 251/313 X |
|---|---|---|---|
| 443,326 | 12/1890 | Leverich | 251/313 X |
| 2,843,353 | 7/1958 | Harden | 251/192 |

Primary Examiner—John C. Fox
Attorney, Agent, or Firm—Howard & Howard

[57] ABSTRACT

A valve assembly includes a valve closing device that is located within the flow passageway closed by the valve. The valve closure device includes a force member for imparting a closing force on a valve disk adjacent to the portion of the disk that contacts a valve seat. The force member is preferably a lever or fulcrum arm having an abutment extension at one end for directly contacting an edge of the valve disk. The opposite end of the lever preferably includes a weight for urging the disk into a closed position and for imparting a closing force upon the disk. The force member is mounted for movement relative to the valve disk and for movement with the valve disk as the valve disk rotates between an open and closed position.

21 Claims, 1 Drawing Sheet

VALVE CLOSURE SYSTEM

BACKGROUND OF THE INVENTION

This invention generally relates to a valve closure device for maintaining a valve member in proper engagement with a valve seat. More particularly, this invention relates to a valve closure device that places a closing force directly onto a valve member adjacent a point of contact between the valve member and a mating valve seat.

A variety of wafer or butterfly-type valve arrangements are known that include a valve member or disk that pivots, relative to a valve seat, between an open and closed position. One application for such valve assemblies is in regenerative incinerators. Strict governmental regulations require that gas leakage through such valves be minimized to reduce pollutants expelled into the atmosphere. Accordingly, several attempts have been made at improving the efficiency of such valves.

These valves typically include a valve disk that rotates about a shaft between a closed position, where the valve disk mates with a valve seat, and an open position. Prior attempts at improving the seal at the disk/valve seat interface include increasing the torque applied in a closing direction to the shaft. The increased torque has not proved satisfactory because the torque, which is applied to the rotating shaft, does not reach the edges of the valve disk, which contact the valve seat. As one example, in regenerative incinerators, the valve disks are subjected to relatively high differential pressures that cause the disk to deflect away from the valve seat. In the past, this may have resulted in undesirable leakage through the valve.

Another attempt at overcoming the difficulties associated with conventional valve assemblies has been to add soft, resilient seals to mate the valve disk with the seat. A significant disadvantage associated with this attempt is that the high temperatures, extreme cycling and contaminated air streams in regenerative incinerators harden the resilient seals. The seals then abraid, resulting in greater leakage than experienced in a system having no such seals.

It is also known to use weights to close a disk valve assembly. The known weight systems, however, suffer from the drawback that the weights are typically mounted away from the disk on a cantilever arm that extends from one or both sides of the disk shaft. Accordingly, any torque imparted by the weights is applied to the disk shaft, which is insufficient for maintaining a closing force at the disk edges. Further, known weight systems are relatively cumbersome and mounted outside of the flow passageway, which further reduces the amount of torque imparted to the disk edges. Moreover, having additional weights on the exterior cambers or bends the disk shaft, which potentially compromises the ability to mate the disk with the valve seat and causes more undesirable leakage.

This invention provides a valve closure device that overcomes the drawbacks and shortcomings of the prior art described above. A valve closure device designed according to this invention operates within the flow passageway to impart a closing force directly adjacent the edges of the valve disk, where it is most needed.

SUMMARY OF THE INVENTION

In general terms, this invention is a valve assembly for closing a passageway that includes a valve seat extending around an inner periphery of the passageway. A valve disk is rotatably mounted within the passageway for rotating about a disk axis between a closed position where the disk contacts the valve seat to close the passageway and an open position. A closing device is coupled to the disk within the passageway and includes a force member that pivots about a different axis than the disk axis to urge the disk into the closed position. The force member also imparts a sealing force adjacent an edge of the disk to maintain the disk in closing contact with the valve seat.

In preferred embodiments, the force member is a fulcrum arm. The fulcrum arm preferably includes an extension at one end, which extends away from the arm to contact one of the disk edges. The extension on the fulcrum arm, therefore, places a closing force directly on the disk near the edge that contacts the valve seat. A weight for urging the disk into the closed position and for providing a closing force is preferably pivotally-mounted on the fulcrum arm at an end distal from the abutment extension.

The various other features and advantages of this invention will become apparent to those skilled in the art in the following detailed description of the presently preferred embodiment. The drawings that accompany the following description can be described briefly as follows.

DETAILED DESCRIPTION OF THE PREFERRED EMBODIMENTS

Figure 1:
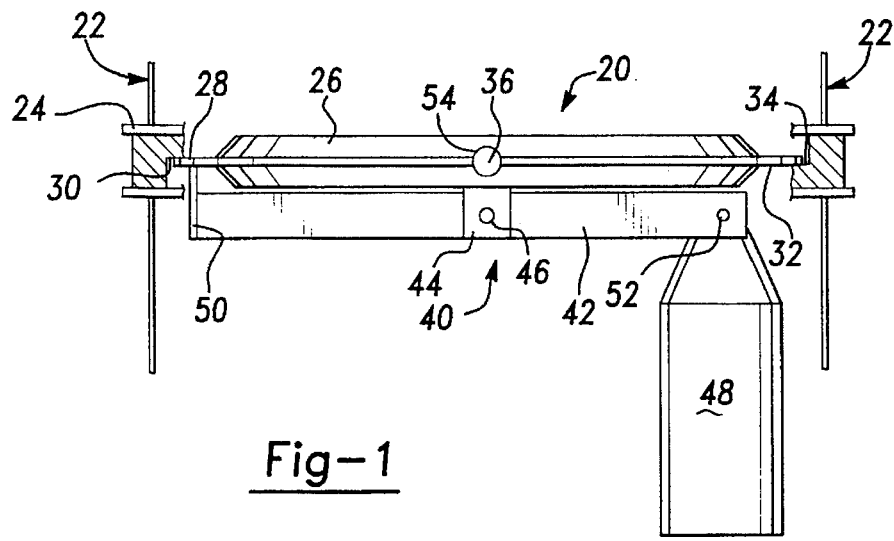
FIG. 1 is a diagrammatic elevational view of a valve assembly having a valve closure device designed according to this invention.

FIG. 1 illustrates a valve assembly 20 for periodically opening and closing to allow flow through passageway 22. The valve assembly 20 includes a valve body 24 that extends about an inner periphery of the flow passageway 22. A valve disk 26 is provided for opening and closing the passageway. The valve disk 26 cooperates with the valve body 24 to close the passageway 22 when edges on the disk 26 contact or mate with a valve seat on the valve body 24. A first disk edge 28 contacts the valve seat at 30 while a second disk edge 32 contacts the valve seat at 34 when the disk 26 is in the closed position illustrated in FIG. 1. Each edge seals on about one half the periphery of the disk.

Figure 3:
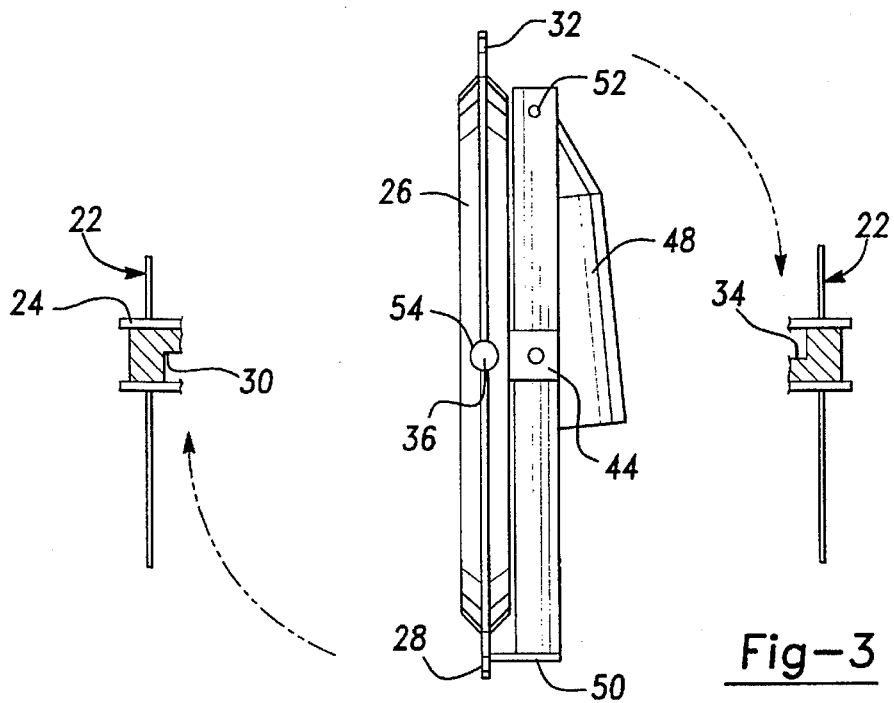
FIG. 3 is a side elevational view of the embodiment of FIG. 1, showing the valve disk in an open position.

The valve disk 26 rotates about a disk axis 36 between the closed position, illustrated in FIG. 1, and an open position (illustrated in FIG. 3). A valve closure device 40 is provided for urging the valve disk 26 into the closed position and for ensuring sufficient contact between the valve disk 26 and the valve seat. The valve closure assembly 40 includes a lever or fulcrum arm 42. The lever 42 is pivotally supported on a mounting bracket 44, which is coupled to the disk 26. The mounting bracket 44 can be readily connected to existing valve disks. Therefore, a significant advantage to a valve closing device designed according to this invention is that the device is easily retrofitted to existing valve assemblies. The lever 42 pivots relative to the mounting bracket 44 about a lever axis 46. Importantly, the lever axis 46 is not coaxial with the disk axis 36.

The valve closing device 40 includes a weight 48 adjacent one end of the lever 42. At a second end of the lever 42, an abutment extension 50 extends away from the lever 42 such that the extension 50 directly contacts or abuts the edge 28 of the disk 26. Because the weight 48 is pulled generally downward (according to the drawing) by gravity and the lever 42 pivots about the lever axis 46, the abutment extension 50 imparts an upward force (according to the drawing) on the disk edge 28. This generally upward force is a closing force that maintains the disk edge 28 in sealing contact with the valve seat at 30. The weight 48 pivots relative to the lever 42 about a weight pivot axis 52. At the same time, since an upward force is imparted at edge 28, disk 26 pivots about axis 36, and edge 32 is biased against seat 34.

Figure 2:
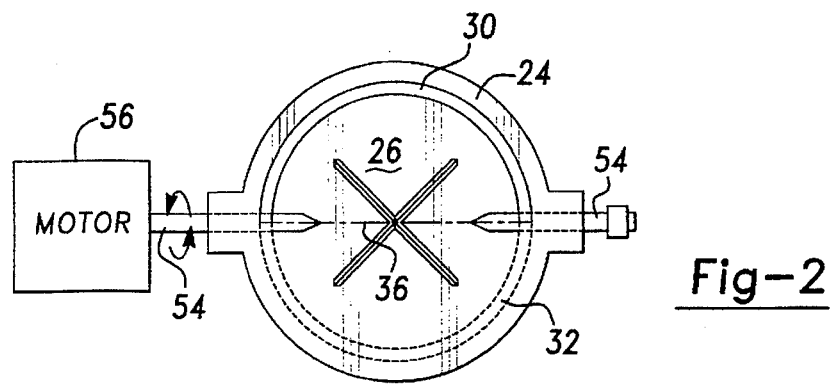
FIG. 2 is a top elevational view of the embodiment of FIG. 1.

FIG. 2 shows a disk shaft 54 coupled to a conventional motor 56. The motor 56 rotates the shaft 54, and therefore the disk 26, in a counter-clockwise direction (according to the drawing) in order to move the disk 26 from the closed position into an open position. This view is somewhat simplified, and in practice it is likely a cam actuator is disposed between the motor and the disk shaft.

FIG. 3 illustrates the valve assembly 20 in an open position. As can be seen from the drawing, the weight 48 pivots about the weight axis 52 as the lever 42 rotates with the valve disk 26. The valve closing device 40 is maintained within the flow passageway 22 at all times. Once the opening torque, provided by the motor 56, is released from the disk shaft 54, the weight 48 pulls the disk 26 into the closed position because of gravity. Once the disk 26 is moved into the closed position (illustrated in FIG. 1), the abutment extension 50 imparts a closing force on the disk edge 28 while the weight 48 indirectly imparts a closing force on the disk edge 32.

The foregoing description is exemplary rather than limiting in nature. Variations and modifications of the disclosed embodiment are possible that do not depart from the spirit and purview of this invention. The scope of this invention is to be limited only by the appended claims.

What is claimed is:

1. A valve assembly for closing a passageway, comprising:

a valve seat extending about an inner periphery of the passageway;

a valve disk rotatably mounted within the passageway for rotating about a first axis between a closed position wherein said disk contacts said valve seat to close said passageway and an open position; and a closing device coupled to said disk within said passageway including a force member that pivots about a second axis to urge said disk into said closed position and to impart a sealing force adjacent an edge of said disk to maintain said disk in contact with said seat.

2. The assembly of claim 1, wherein said second axis is generally parallel to said first axis.

3. The assembly of claim 1, wherein said force member comprises a fulcrum arm supported on said disk for pivoting about said second axis relative to said disk and wherein said fulcrum arm is aligned generally perpendicular to said disk axis.

4. The assembly of claim 3, wherein said arm comprises an extension at a first end of said arm that extends from said arm to contact said disk adjacent said edge of said disk in said closed position, to thereby impart said sealing force.

5. The assembly of claim 4, further comprising a weight pivotally supported on said arm adjacent a second end of said arm distal from said first end for pivoting about a weight axis within said passageway as said disk and said arm rotate.

6. The assembly of claim 5, wherein said weight urges a second edge of said disk into closing engagement with said seat in a closing direction opposite from said sealing force imparted by said extension.

7. The assembly of claim 1, wherein said closing device comprises a mounting bracket for mounting said force member on one side of said disk, said force member is a rigid, generally elongated member having an abutting portion adjacent a first end for abutting said edge of said disk to thereby impart said sealing force and a weight adjacent a second end for urging said disk into said closed position.

8. The assembly of claim 7, wherein said force member is aligned within said passageway in a direction that is generally perpendicular to said first axis and wherein said second axis is generally parallel to said first axis, said second axis being defined through said mounting bracket.

9. A valve assembly, comprising:

a valve body having a valve seat;

a valve disk rotatably supported for rotation about a first axis and having edges that move into or out of closing engagement with said valve seat upon rotation of said disk;

means for rotating said disk out of engagement with said seat; and a valve closing device supported for rotational movement with said disk and including a force member that pivots about a second axis and has a first end that engages one of said disk edges when said force member pivots about said second axis in a closing direction, said force member first end urging said one of said disk edges into sealing engagement with said valve seat.

10. The assembly of claim 9, wherein said second axis is generally parallel to said first axis.

11. The assembly of claim 9, wherein said closing device comprises a mounting bracket, connected to said valve disk, for mounting said force member adjacent said disk and a weight connected to said force member for urging said disk and said force member in said closing direction.

12. The assembly of claim 11, wherein said force member comprises a fulcrum arm, said first member end includes a contact portion, extending away from said arm, for contacting said one of said disk edges and wherein said weight is supported on said fulcrum arm at a second end distal from said first end.

13. The assembly of claim 12, wherein said weight is pivotally supported on said arm for pivotal movement about a weight axis when said disk rotates.

14. The assembly of claim 9, wherein said force member comprises a fulcrum arm extending along one side of said disk in a direction generally perpendicular to said first axis.

15. The assembly of claim 14, wherein said arm includes an abutment extension adjacent said first arm end for abutting said disk adjacent said disk edge as said arm pivots about said second axis in said closing direction.

16. The assembly of claim 15, further comprising a weight supported on said arm adjacent a second end of said arm distal from said first arm end and wherein said second axis is centrally located longitudinally along said arm between said weight and said abutment extension.

17. The assembly of claim 16, further comprising a mounting bracket for coupling said fulcrum arm to said disk and wherein said second axis is defined through said bracket such that said arm pivots relative to said bracket.

18. A valve closing device for use in a valve assembly having a pivoting valve disk that pivots within a passageway between a closed position and an open position, comprising:

a mounting bracket adapted to be coupled to the valve disk;

a lever member pivotally supported by said mounting bracket within the passageway for pivoting about a lever axis;

a weight supported on said lever member within the passageway for urging the valve disk into the closed position; and an abutment extension extending from said lever member to abut one edge of the valve disk to thereby impart a closing force adjacent said disk edge for maintaining the disk in the closed position.

19. The device of claim 18, wherein said weight is supported on said lever member adjacent a first end of said lever member and said abutment extension is adjacent a second end of said lever member distal from said first end.

20. The device of claim 19, wherein said weight is pivotally supported on said lever member such that said weight pivots relative to said lever when said disk rotates between said open and closed positions and such that said weight imparts a closing force on an edge of the disk radially opposite from the edge abutted by said abutment extension.

21. A regenerative thermal oxidizer, comprising:

a combustion chamber;

a plurality of heat exchangers each communicating with said combustion chamber at one end;

a plurality of passageways communicating with a second end of each said heat exchanger;

a rotary valve associated with each said passageway; and a valve closing assembly associated with each said valve and including a force member pivotally supported within said passageway for rotation with said valve to urge said valve into a closed position such that said passageway is closed, each force member imparting a closing force directly onto an edge of each said valve within each said passageway.

* * * * *